3,225,039
N-TRITYL-MORPHOLINES AND PROCESS FOR
THEIR PRODUCTION
Clive B. C. Boyce, Herne, Kent, and Panayiotis N. Manis,
Sittingbourne, Kent, England, assignors to Shell Oil
Company, New York, N.Y., a corporation of Delaware
No Drawing. Filed Nov. 23, 1962, Ser. No. 239,789
Claims priority, application Great Britain, Nov. 30, 1961,
42,890/61
3 Claims. (Cl. 260—247)

This invention relates to a method of combatting molluscs, particularly snails of the genera *Oncomelania, Australorbis* and *Bulinus* which are schistosome intermediate hosts, and snails of the genera *Lymnaea* which are intermediate hosts for the liver fluke worm, and to a method of reducing the incidence of Bilharziasis which comprises treating said molluscs or their habitat, or both molluscs and their habitat, with molluscicidal compound as hereinafter specified, or with a composition comprising said compound. The invention also relates to novel molluscicidal compounds, to a process for their preparation and to molluscicidal compositions comprising any of said compounds.

According to this invention, molluscs are controlled by subjecting them to a compound of the general formula

   (I)

and acid addition salts thereof. In this formula, R, R' and R" each independently represents a phenyl radical or a phenyl radical substituted by from one to a plurality of substituents from the group consisting of halogen atoms, lower alkyl radicals, lower alkoxy radicals and lower amino groups; Z represents hydrogen or a lower alkyl radical; Z' represents a lower olefinically unsaturated aliphatic hydrocarbon radical, a cycloaliphatic hydrocarbon radical, a radical of the formula -(CH$_2$)$_n$O-alkyl, wherein $n$ is an integer from zero to 10, preferably from 1 to 4, and "alkyl" is a lower alkyl radical, a radical of the formula —CH$_2$—Z", wherein Z" represents a lower alkoxycarbonyl radical containing from 2 to 5 carbon atoms, or a heterocyclic radical, with the proviso that Z and Z' together can represent a divalent radical completing with the indicated nitrogen atom a heterocyclic ring.

In the substituent(s) on the phenyl ring or rings, the halogen substituent(s) preferably is (are) fluorine, chlorine or bromine, while the alkyl and alkoxy substituent(s) preferably contain(s) from 1 to 4 carbon atoms. The amino substituent(s) is (are) of the formula —N(H)$_a$(B)$_b$, wherein $a=1$ or 2 and $a+b=2$, and B is a hydrocarbon radical of up to 10 carbon atoms, preferably free from olefinic and acetylenic unsaturation, preferably alkyl from 1 to 4 carbon atoms. The alkyl radical represented by Z preferably contains from 1 to 4 carbon atoms.

The olefinically unsaturated aliphatic hydrocarbon radical which Z' can represent preferably is a beta,gamma-alkenyl radical of up to 6 carbon atoms, preferably allyl or methallyl. The olefinically unsaturated cycloaliphatic radical which Z' can represent preferably contains from 5 to 10 carbon atoms, with from 5 to 6 carbon atoms in the ring; it may be a cycloalkenyl or a cycloalkadienyl radical. Where Z" represents a heterocyclic radical, it preferably represents a heterocyclic radical containing no more than 10 carbon atoms, and containing from 5 to 6 atoms in the ring. The ring may be saturated or unsaturated. There may be more than one hetero atom in the ring; preferably the hetero atom or atoms is (are) oxygen, nitrogen or sulfur. Desirably, the hetero ring is composed of one atom of nitrogen, oxygen or sulfur and from four to five atoms of carbon, with attachment to the methylene group being at a carbon atom of the hetero ring. Examples of suitable hetero radicals are the furyl, pyranyl, thienyl, and pyridyl radicals and their partially or completely hydrogenated derivatives. Particularly high molluscicidal activity is exhibited by compounds of formula (I) wherein Z" represents a furyl or pyranyl radical or a partially or completely hydrogenated furyl or pyranyl radical and such compounds are therefore preferred compounds for use according to the invention.

Z and Z' together may represent a radical completing with the nitrogen atom a heterocyclic ring. This nitrogen atom may be the sole hetero atom or there may be an additional nitrogen or oxygen atom in the ring. The ring is preferably 5- or 6-membered and may be unsaturated or saturated. Particularly high molluscicidal activity is exhibited by compounds in which this heterocyclic radical is a pyrrolidyl, tetrahydropyridyl, piperidyl, morpholinyl or 1,2-oxazolidinyl radical and these compounds are therefore preferred compounds for use according to the invention.

The suitable salts of such compounds are those of inorganic acids, for example the hydrochlorides, hydrobromides, nitrates, sulfates or phosphates, and the salts of organic acids, for example of lower carboxylic acids such as the formates, the acetates, salts of alkanesulfonic acids, salts of benzenesulfonic acids, such as isethionic acid or benzenesulfonic acid, or of picric acid.

Typical species of these compounds are described, and their preparation shown in Examples I through XIII, following. While a few of these compounds are known, many are novel, and accordingly form one aspect of this invention.

Another aspect of the invention is the provision of a simple, efficient process for preparing compounds of the kind defined in formula (I). Briefly, this process comprises reacting a trityl chloride, or the appropriate halogen- or alkyl-substituted trityl chloride, with the appropriate amine of formula HNZZ' wherein Z and Z' have the respective meanings already set out herein, in the presence of a hydrogen chloride acceptor. (By "trityl" is meant the triphenylmethyl moiety.) The reaction may be effected in absence of a solvent but the presence of an inert solvent is preferred. Suitable solvents are, for example, aromatic hydrocarbons such as benzene, acetonitrile and ketones containing up to six carbon atoms such as acetone or methyl ethyl ketone. The hydrogen chloride acceptor employed may be the amine HNZZ' in appropriate excess or a tertiary amine, particularly triethylamine, may be used. Inorganic bases are not suitable for use as hydrogen chloride acceptors in this reaction as the water formed by reaction with hydrogen chloride decomposes the trityl chloride. The reaction is preferably effected at an elevated temperature, temperatures in the range 50° to 150° C. being in general suitable.

The reaction mixture may be worked up by any suitable method. One method involves separating the base-hydrochloride formed, for example, by filtration, concentrating the mother liquor until the desired product crystallizes out, isolating it and, if necessary, purifying it for example recrystallizing from a suitable solvent. Alternatively, the reaction mixture may be poured into water, when the base-hydrochloride dissolves and the desired product separates as a solid which can be purified if desired.

The following examples illustrate the novel compounds of the invention and their preparation. In these examples, parts by weight (w) and parts by volume (v) bear the same relation as the kilogram and the litre.

*Example I: Preparation of N-tritylmorpholine*

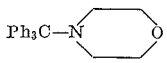

A solution of trityl chloride (27.8 w.) and morpholine (17.4 w.) in benzene (500 v.) was boiled under reflux for 3 hours. The solvent was then removed under reduced pressure and the residue thoroughly washed with water to remove morpholine hydrochloride. The solid residue was recrystallized from ethanol. The product melted at 174° to 176° C. and after being allowed to cool and resolidify, melted at 185° to 186° C.

*Analysis.*—Found: C, 83.7%; H, 7.0%; N, 4.2%. $C_{23}H_{23}NO$ requires: C, 83.9%; H, 7.0%; N, 4.2%.

In a manner similar to that described in Example I were prepared the following compounds:

*Example II*

N-tritylcyclohexylamine, M.P. 126° to 127.5° C. after recrystallization from ethanol.

*Analysis.*—Found: C, 88.0%; H, 8.2%; N, 4.0%. $C_{25}H_{27}N$ requires: C, 88.0%; H, 7.9%; N, 4.1%.

*Example III*

N-tritylallylamine, M.P. 84° to 85° C. after recrystallization from ethanol.

*Analysis.*—Found: C, 88.4%; H, 7.0%; N, 4.6%. $C_{22}H_{21}N$ requires: C, 88.3%; H, 7.0%; N, 4.7%.

The hydrochloride M.P. 164 to 166° C. was prepared by passing dry hydrogen chloride through the ethereal solution of the base.

*Analysis.*—Found: Cl, 10.7%. $C_{22}H_{21}N.HCl$ requires: Cl, 10.6%.

*Example IV*

N-trityl 2-aminopyridine, M.P. 150° to 151° C. after recrystallization from ethanol.

*Example V*

N-tritylpyrrolidine, M.P. 131° to 132.5° C. after recrystallization from ethanol.

*Analysis.*—Found: C, 88.4%; H, 7.3%; N, 4.4%. $C_{23}H_{23}N$ requires: C, 88.2%; H, 7.3%; N, 4.5%.

The hydrochloride M.P. 146° to 147° C. was prepared by passing dry hydrogen chloride through an ethereal solution of the base.

*Analysis.*—Found: Cl, 9.9%. $C_{23}H_{23}N.HCl$ requires: Cl, 10.1%.

*Example VI: Preparation of N-(p-fluorophenyldiphenyl morpholine)*

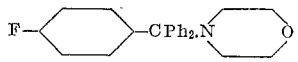

p-Fluorotriphenylcarbinol (2.7 w.) was heated with acetyl chloride (10 v.) for 1 hour on a water bath and excess of acetyl chloride then removed in vacuo. The residue was washed with cold light petroleum (20 v.), dissolved in acetonitrile (10 v.) and morpholine (3 v.) added. After being heated under reflux for 3 hours, the mixture was poured into water. The solid product (2.0 w.) was obtained pure after two recrystallizations from ethanol. It had M.P. 165° to 166° C.

*Analysis.*—Found: C, 79.1%; H, 6.4%; N, 4.1%. $C_{23}H_{22}FNO$ requires: C, 79.5%; H, 6.35%; N, 4.05%.

In a similar way was prepared:

*Example VII: N-(o-methyltrityl)morpholine*

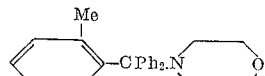

It was obtained as colorless prisms M.P. 147° to 148° C. on crystallization from ethanol.

*Analysis.*—Found: C, 83.9%; H, 7.5%; N, 4.2%. $C_{24}H_{25}NO$ requires: C, 83.9%; H, 7.3%; N, 4.1%.

*Example VIII: Preparation of N-tritylisoxazolidine*

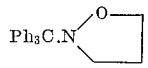

A mixture of isoxazolidine hydrochloride (8.7 w.; King, J.C.S., 1942, 432), triethylamine (18 w.) and trityl chloride (14 w.) in dry acetone (100 v.) was heated under reflux for 2 hours. The triethylamine hydrochloride formed was filtered off and the filtrate concentrated to small volume when a solid (11.5 w.) separated. This was recrystallized twice from light petroleum and then from acetone. The product was obtained as small pale colored prisms M.P. 136° to 137° C.

*Analysis.*—Found: C, 84.1%; H, 6.9%; N, 4.5%. $C_{22}H_{21}NO$ requires: C, 83.8; H, 6.7%; N, 4.4%.

*Example IX: Preparation of 3-methoxy-N-tritylproylamine*

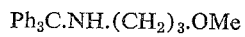

A mixture of trityl chloride (14.0 w.), triethylamine (10 v.) and 3-methoxypropylamine (4.5 w.) in acetone (50 v.) was heated under reflux for 3 hours. The mixture was then poured into water, the precipitate separated, washed with ethanol and then twice recrystallized from ethanol. The product was obtained as colorless plates, M.P. 82° to 84° C.

*Analysis.*—Found: C, 84.2%; H, 7.6%; N, 4.2%. $C_{23}H_{25}NO$ requires: C, 83.4%; H, 7.8%; N, 4.2%.

*Example X: Preparation of N-methyl-N-trityl-2-furfurylamine*

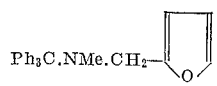

A mixture of trityl chloride (14 w.), N-methyl-2-furfurylamine (5.5 w.) triethylamine (5.05 w.) and acetonitrile (50 v.) was warmed on a water bath for 30 minutes. The solution was poured into water and gummy material thus obtained was triturated with ethanol and so made to solidify. It was recrystallized from a mixture of ethanol and benzene, when it was obtained as a yellowish white powder, M.P. 101° to 103° C. Yield 12 w. (70%).

*Analysis.*—Found: C, 84.7%; H, 6.8%; N, 4.0%. $C_{25}H_{23}NO$ requires: C, 85.0%; H, 6.5%; N, 4.0%.

*Example XI: Preparation of N-trityl-1,2,5,6-tetrahydropyridine*

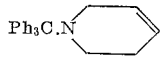

A solution of trityl chloride (14.0 w.) and tetrahydropyridine (8.3 w.) in acetone (75 v.) was heated under reflux for 1 hour. The base hydrochloride formed was filtered off and the filtrate concentrated when a solid (9.5 w.) separated. After three recrystallizations from acetone, the product had M.P. 175° to 176° C.

*Analysis.*—Found: C, 88.8%; H, 7.4%; N, 4.4%. $C_{24}H_{23}N$ requires: C, 88.6%; H, 7.1%; N, 4.3%.

*Example XII: Preparation of N-tritylfurfurylamine*

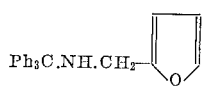

A mixture of trityl chloride (14 w.), 2-furfurylamine (10 w.) and acetone (100 v.) was heated under reflux for 3 hours, the mixture then poured into water and the crude solid recrystallized twice from ethanol. The product (8.0 w.) had M.P. 101° C.

*Analysis.*—Found: C, 85.2%; H, 6.5%; N, 4.2%. $C_{24}H_{21}NO$ requires: C, 84.9%; H, 6.2%; N, 4.1%.

*Example XIII: Preparation of N-bis(p-dimethylamino-phenylphenyl)morpholine*

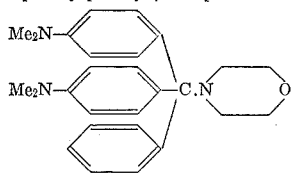

A solution of Malachite Green (2 w.) and morpholine (2 v.) in acetone (100 v.) was refluxed for 3 hours. The mixture was then diluted with water and extracted with ether. The solvent was removed and the residue recrystallized from acetone. The desired product was obtained as colorless crystals which turned green on standing. M.P. 175° C.

*Analysis.*—Found: C, 78.2%; H, 8.2%; N, 10.0%. $C_{27}H_{33}N_3O$ requires: C, 78.0%; H, 8.0%; N, 10.1%.

In Table I are summarized the results of tests carried out with the above compounds to test their efficiency as molluscicides. In these tests 4 replicates of five adult snails were exposed for 24 hours to an aqueous solution or dispersion of the toxicant. The snails were then rinsed in fresh water and kept in fresh water for 24 hours. At the end of this time mortality counts were made.

The aqueous solutions or dispersions used in these tests were prepared as follows:

10 milligrams of the test compound was dissolved in 1 milliliter of acetone containing 8 milligrams of Triton X–100 as emulsifier and the resulting solution was made up to 500 milliliters with water. The aqueous solution or dispersion so obtained contained 20 parts per million (p.p.m.) of the test compound, 16 p.p.m. of Triton X–100 and 1600 p.p.m. of acetone. This was diluted with water to give solutions or dispersions containing lower concentrations of the test compound.

*Table 1*

| Test Compound $Ph_3CNZZ'$ —NZZ'= | Percent Kill of Australorbis glabratus (p.p.m.) | | | | | | |
|---|---|---|---|---|---|---|---|
| | 2 | 1 | 0.5 | 0.25 | 0.12 | 0.06 | 0.03 |
| —NH.CH₂.CH=CH₂ | 100 | 100 | 100 | 100 | 100 | 70 | |
| HCl | 100 | 100 | 100 | 100 | 40 | | |
| —NH—⌬ | 100 | 100 | 100 | 40 | 20 | | |
| —NHOMe | | 40 | | | | | |
| —NH(CH₂)₃OMe | 100 | 100 | 80 | 60 | 20 | | |
| —NH.CH₂.COOEt | 60 | | | | | | |
| —NH.CH₂-furyl | | | | 100 | 100 | 100 | 100 |
| —N(Me).CH₂-furyl | 100 | 100 | 60 | | | | |
| —N⌬ | 100 | 100 | 100 | 80–100 | 20–100 | 10 | |
| —N⌬ | 100 | 100 | 100 | 100 | 100 | 100 | 100 |
| —N⌬ | 100 | 100 | 100 | 100 | 100 | 100 | 50 |
| .HCl | 100 | 100 | 100 | 100 | 100 | 100 | 40 |
| —N⌬O | 100 | 100 | 100 | 100 | 100 | 100 | 80 |
| F-C₆H₄-C(Ph)₂-N⌬O | 100 | 100 | 100 | 100 | 100 | 80 | 80 |
| Me-C₆H₄-C(Ph)₂-N⌬O | 100 | 100 | 100 | 100 | 100 | 60 | 20 |
| —N(O-ring) | 100 | 100 | 100 | 100 | 50 | | |

It can be seen that particularly high molluscicidal activity is exhibited by N-tritylmorpholine, N-(p-fluorotrityl)morpholine and by N-tritylfurfurylamine.

In areas where fishery interests are of prime importance, a compound used to control molluscs preferably is non-toxic or of only low toxicity to fish. The toxicity of two of the more active molluscicidal compounds to fish was therefore determined as follows:

Aqueous dispersions containing various concentrations of the molluscicidal compound were prepared as described above. Two male and two female guppies (*Lebistes reticulatus*) were exposed for 24 hours to each concentration of the compound and were then transferred to fresh water to observe mortality. The tests were carried out in duplicate. The results are summarized in Table II, where $LC_{100}$ represents the number of parts per million of the test compound which causes 100% mortality of fish.

Table II

| Test Compound $Ph_3CNZZ'$ $-NZZ'=$ | Fish Toxocity $(LD_{100})$ |
|---|---|
| 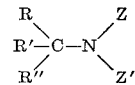 | 10 -20 |
| 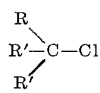 | 0.25- 0.5 |

It will be seen that these compounds thus are substantially nontoxic to fish at their molluscicidally effective dosages.

Besides being toxic to *Australorbis glabratus*, N-tritylmorpholine was also toxic to *Bulinus truncatus*, *B. angolensis* and *Tropicorbis centrimetralis* at 0.125 p.p.m. concentration (the lowest concentration tested) and to *Limnaea natalensis* and *L. auricularia* at 0.06 p.p.m. concentration. N-tritylmorpholine has the additional advantage of low mammalian toxicity, the acute oral toxicity LD 50 to rats being about 1500 mg. per kilogram body weight.

This invention also provides novel molluscicidal compositions comprising a compound of the general formula hereinbefore specified, as the active ingredient or ingredients, together with a solid or liquid carrier or a surface active agent, or a solid or liquid carrier and a surface active agent.

Aqueous dispersions in which the particles of said compound are 5 microns or less in diameter, preferably less than 1 micron in diameter and more particularly of colloidal dimensions, exhibit particularly high molluscicidal activity. Such dispersions may be prepared by any suitable method known in the art. A particularly suitable method comprises pouring a concentrated solution comprising the compound and a dispersing agent in a water-miscible solvent into water, for example, into the water of the river, pond, irrigation canal etc. to be treated. These solutions and the aqueous dispersions obtained on diluting them with water are preferred compositions of the invention. The water-miscible solvent, may for example, be a water soluble aliphatic ketone such as acetone or methyl ethyl ketone, a water-soluble alcohol such as methyl, ethyl or isopropyl alcohol, dimethylformamide or ethyl oxitol. The dispersing agent suitably constitutes 5 to 20 percent by weight of the solution and preferably 5 to 10 percent by weight thereof. On pouring the solution into water, an opalescent dispersion is obtained in which the compound is present in colloidal form. These opalescent dispersions are highly toxic to water snails. The dispersing agent used my be non-ionic, for example, polyalkylene oxide condensation products of alkylphenols such as the condensation product of octylphenol with 8 or 10 molecular proportions of ethylene oxide, or ionic, for example, sodium salts of secondary alkyl sulphuric acid esters containing 10 to 20 carbon atoms in the alkyl group, or sodium salts of sulphonates of alkyl aryl polyethers, or salts (particularly calcium salts) of alkyl aryl sulphonates such as calcium dodecylbenzene sulphonate. Mixtures of non-ionic and ionic dispersing agents may also be used.

The compositions of the invention may also be emulsifiable concentrates comprising a solution or dispersion of the compound in a water-immiscible organic liquid and an emulsifying agent. These compositions form more or less stable emulsions on addition to water. The water-immiscible organic liquid used may be, for example, a hydrocarbon for example, toluene, xylene, a mineral oil, for example kerosine, or a petroleum horticultural spray oil or a chlorinated hydrocarbon, for example a chlorinated benzene, carbon tetrachloride or trichloroethylene. The emulsifying agents may be of the types described above.

The compositions of the invention may also be wettable powders comprising the compound in finely divided form and a dispersing agent such as lignin sulphonates or polyacrylates, or a dispersing agent and a wetting agent such as sodium lauryl sulphate, sodium N-methyl-N-oleyl laurate, sodium salts of petroleum sulphonates, sodium diocetyl hydrolysed proteins such as peptones and amino acids.

The molluscicidal compound suitably constitutes 0.25 to 1 percent by weight of the attractant or bait though lower or higher concentrations may be used if desired.

The compositions of the invention containing no attractant or bait are preferably used so that when dispersed in water from 0.25 to 1.0 percent by weight of the molluscicidal compound is present per million parts of water, though higher concentrations may be used if desired. A fundamental advantage of the compositions comprising a bait in addition to the molluscicidal compound is that the content of the molluscicidal compound is not related to the volume of water to which the composition is applied.

We claim as our invention:
1. N-tritylmorpholine.
2. N-(p-fluorotrityl)morpholine.
3. A process for preparing a compound of the formula:

$$\begin{array}{c} R \\ R'-C-N \\ R'' \end{array} \begin{array}{c} Z \\ Z' \end{array}$$

wherein R, R', and R'' each independently represents a member of the group consisting of phenyl and phenyl substituted by at least one of the group consisting of fluorine, chlorine, bromine, alkyl of 1 to 4 carbon atoms, alkoxy of 1 to 4 carbon atoms and amino and monoalkylamino of 1 to 4 carbon atoms;

Z is alkyl of 1 to 4 carbon atoms;

Z' is a member of the group consisting of alkenyl of up to 6 carbon atoms, cycloalkenyl of 5 to 10 carbon atoms and cycloalkadienyl of 5 to 10 carbon atoms, with the proviso that Z and Z' together can represent the divalent moiety completing the hereterocyclic ring with the indicated nitrogen atom, which comprises reacting the appropriate triphenyl chloride, $$\begin{array}{c} R \\ R'-C-Cl \\ R'' \end{array}$$

with the appropriate amine, HNZZ' at a temperature of 50° to 150° C.

References Cited by the Examiner
UNITED STATES PATENTS

| 1,915,334 | 6/1933 | Salzberg et al. | 260—243 |
| 2,075,359 | 3/1937 | Salzberg et al. | 167—22 |
| 2,828,341 | 3/1958 | Adams et al. | 260—570 |
| 2,844,599 | 7/1958 | Rendall et al. | 260—389 |
| 2,861,919 | 11/1958 | Gilbert | 167—33 |
| 2,916,490 | 12/1959 | Schenck et al. | 260—247 |
| 2,958,624 | 11/1960 | Bimber | 167—33 |

OTHER REFERENCES

Von Meyer "Chemical Abstracts" vol. 5, page 1595, (1911).

NICHOLAS S. RIZZO, *Primary Examiner.*

IRVING MARCUS, JOHN D. RANDOLPH, *Examiners.*